(12) United States Patent
Allen et al.

(10) Patent No.: US 11,760,644 B2
(45) Date of Patent: Sep. 19, 2023

(54) SURFACE FUNCTIONALIZATION OF INORGANIC NANOCRYSTALS FOR NANOCOMPOSITE ADDITIVE MANUFACTURING

(71) Applicant: Vadient Optics, LLC, Beaverton, OR (US)

(72) Inventors: Thomas Leonard Allen, Eugene, OR (US); Edward Whitney Elliott, III, Eugene, OR (US); John Paul Harmon, Albany, OR (US); Chris Weber, Eugene, OR (US); Charles G Dupuy, Corvallis, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 944 days.

(21) Appl. No.: 16/537,358

(22) Filed: Aug. 9, 2019

(65) Prior Publication Data

US 2021/0039163 A1 Feb. 11, 2021

(51) Int. Cl.

| | |
|---|---|
| *C01B 33/00* | (2006.01) |
| *C01B 33/12* | (2006.01) |
| *B22F 3/10* | (2006.01) |
| *C01D 15/04* | (2006.01) |
| *C01G 25/02* | (2006.01) |
| *C01G 49/08* | (2006.01) |
| *C01G 23/04* | (2006.01) |
| *B22F 10/00* | (2021.01) |
| *B82Y 35/00* | (2011.01) |
| *B33Y 70/10* | (2020.01) |

(Continued)

(52) U.S. Cl.
CPC ............ *C01B 33/12* (2013.01); *B22F 3/1035* (2013.01); *B22F 10/00* (2021.01); *B33Y 70/10* (2020.01); *B82Y 35/00* (2013.01); *C01D 15/04* (2013.01); *C01G 23/04* (2013.01); *C01G 25/02* (2013.01); *C01G 49/08* (2013.01); *B22F 1/054* (2022.01); *B22F 1/102* (2022.01); *B33Y 10/00* (2014.12); *C01P 2004/64* (2013.01)

(58) Field of Classification Search
CPC . B33Y 70/00; Y10T 428/2991; B22F 1/0545; B22F 1/16; B22F 3/105
See application file for complete search history.

(56) References Cited

U.S. PATENT DOCUMENTS

| | | | |
|---|---|---|---|
| 2012/0065311 A1* | 3/2012 | Chakraborty | B82Y 30/00 977/734 |
| 2013/0081335 A1* | 4/2013 | Mazyar | C01B 32/05 423/446 |
| 2016/0060377 A1* | 3/2016 | Tsotsis | C08L 79/08 548/406 |

FOREIGN PATENT DOCUMENTS

| | | | | |
|---|---|---|---|---|
| CN | 103011793 A | * | 4/2013 | |
| WO | WO-2010039897 A2 | * | 4/2010 | ........... C09K 11/025 |
| WO | WO-2019114832 A1 | * | 6/2019 | |

OTHER PUBLICATIONS

Translation WO-2019114832 (Year: 2019).*

* cited by examiner

*Primary Examiner* — Hoa (Holly) Le
(74) *Attorney, Agent, or Firm* — Alleman Hall Creasman & Tuttle LLP (57) ABSTRACT

An aqueous or organic solvent medium for additive manufacturing technologies comprising a nanocrystal comprising a functional group. The nanocrystal material is selected from a metal oxide, fluoride, metallic, carbon-based, semiconducting quantum dot or combinations thereof. The functional group comprises primary amine, carboxylic acid, lactam ring, polyamide polymer chain or group used to attach a similar functional group.

19 Claims, 6 Drawing Sheets

(51) Int. Cl.
*B33Y 10/00* (2015.01)
*B22F 1/054* (2022.01)
*B22F 1/102* (2022.01)

SURFACE FUNCTIONALIZATION OF INORGANIC NANOCRYSTALS FOR NANOCOMPOSITE ADDITIVE MANUFACTURING

TECHNICAL FIELD OF THE DISCLOSURE

The present disclosure relates in general to additive manufacturing materials. The disclosure relates in particular to nanocrystals with a surface functionalized to grow and incorporate branched sections of polyamide.

BACKGROUND DISCUSSION

Nanoparticles are synthesized in a variety of ways. The present disclosure relates to a unique and novel approach.

SUMMARY OF THE DISCLOSURE

The present disclosure is directed to an aqueous or organic solvent medium for additive manufacturing technologies comprising a nanocrystal comprising a functional group. The nanocrystal material is selected from a metal oxide, fluoride, metallic, carbon-based, semiconducting quantum dot or combinations thereof. The functional group comprises primary amine, carboxylic acid, lactam ring, polyamide polymer chain or group used to attach a similar functional group.

BRIEF DESCRIPTION OF THE DRAWINGS

The accompanying drawings, which are incorporated in and constitute a part of the specification, schematically illustrate embodiments of the present disclosure, and together with the general description given above and the detailed description of preferred methods and embodiment given below, serve to explain principles of the present disclosure.

DETAILED DESCRIPTION

Referring now to the drawings, wherein like components are designated by like reference numerals. Methods of manufacture and various embodiments of the present disclosure are described further herein below.

Nanocrystals are chemically treated to attach functional groups on the surface. This present disclosure includes nanocrystals of several material types comprising metal oxides and fluorides ($ZrO_2$, $TiO_2$, $SiO_2$, $Fe_3O_4$, $YVO_4$, LiF, $NaYF_4$ and others), metallic (Au, Ag, Co, Fe, Ni), carbon based (graphene, CNTS, or diamond), and semiconducting quantum dots (InP, $CuInS_2$, PbS, CdSe, etc.). The functional groups may be primary amine, carboxylic, lactam ring, or group used to attach a similar version. Anchors are chosen specifically to covalently attach to the nanocrystal surface leaving a polyamide compatible reactive group exposed. This is uniquely determined by the type of nanocrystal surface chemistry, size of the nanocrystal, and method of producing the nanocrystal.

Different nanocrystal surface chemistry may be functionalized to react polyamides on the surface. The resulting reaction product may be used to create the polyamide feedstock for SLS AM machines to make a variety of different types of high strength composites. The synthesis of polyamide functionalize nanopowders with dimensions in the 5-80 um range is then realized by blending surface functionalized and Nylon ready nanocrystals into a reaction mixture with Nylon monomers or already polymerized Nylon of known M.W.

Figure 1:
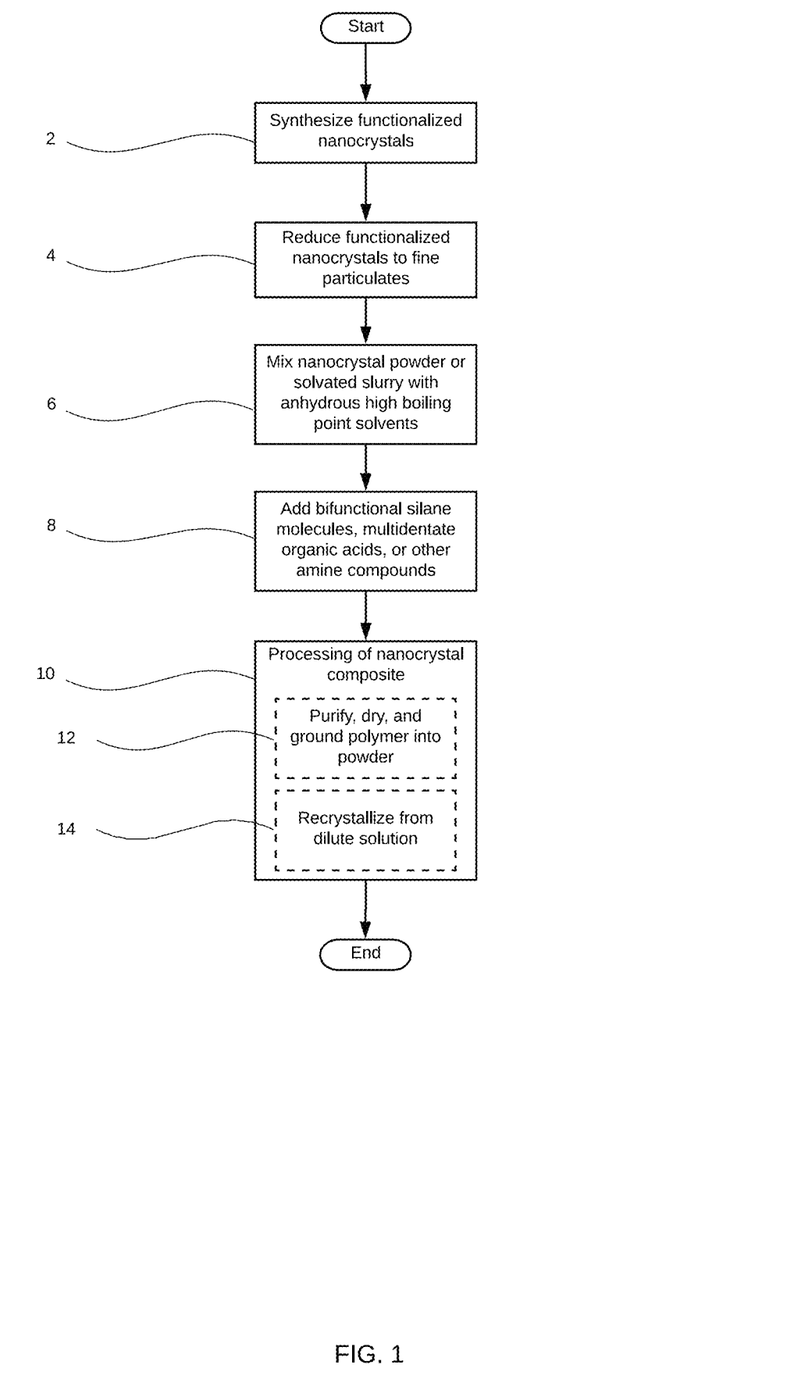
FIG. 1 is a flowchart for a method of synthesis and processing functionalized nanocrystals to make nylon composites for powder bed technologies.

Referring to FIG. 1, FIG. 1 depicts a flowchart for a method of synthesis and processing of functionalized nanocrystals for improved composite blending and quality of nylon nanocomposites for powder bed technologies. In step 2, synthesized nanocrystals may be surface functionalized with groups comprising active carboxylic acid, primary amine, azide, acrylate or alkyl aliphatic chain.

From this, a polymerization reaction is initiated to grow polymeric ligands and incorporate into larger branched polymeric sections of polyamide and specifically nylon 12. One advantage of functionalizing nanocrystal surfaces with carboxylic acid groups allows for use as terminating groups in the actual polymerization of Nylon thereby reducing the amount of additives needed for controlling chain length. Further, the molar number of carboxylic acid groups functionalized on nanocrystal surfaces may also be tuned thereby giving the ability to control the degree of polymerization.

In step 4, functionalized nanocrystals are reduced to a fine particulate after selected from specific size and chemically tuned synthesized nanocrystals. Separation and/or purification of these nanocrystals according to size may be performed via means magnetic separation or magnetic fractionation comprising an electromagnet or a permanent magnet. In step 6, the nanocrystal powder or solvated slurry may be mixed with anhydrous high boiling point solvents such as alcohols and diols thereby dispersing in nylon monomers directly or to pre-polymerized Nylon of chosen properties. In one instance, the nanocrystal powder or solvated slurry may be mixed with 1,4-butanediol. Solvents may then be removed via rotary evaporation wherein the heat bath may be tuned. These solvents may also be removed while heating under vacuum via non-rotary evaporation. Alternatively, solvents may be allowed to remain thereby initiating polyamide polymerization in the presence of the functionalized nanocrystals.

In step 8, in order to enhance crosslinking for improved blending and solubility in the polymer to increase particle separation as well as adjusting the Nylon properties to crosslink into specific polymer for improved composite strength, bifunctional silane molecules and/or other multidentate organic acids and/or amine compounds may be added. In step 10, the processing of the nanocrystal composite comprises of step 12, which is to purify, dry, and ground polymer into powder, or in step 14, the resulting nanocrystal polyamide composite may be slowly recrystallized from a dilute solution. This may be accomplished by nucleating out Nylon-nanocrystal chains via slowly reducing the heat thereby producing small micron-sized powder.

Hot recrystallization may be applied to increase solubility and mixing uniformity if nanocrystal stock materials had to blend into already polymerized nylon thereby preventing nanocrystal aggregation and resulting in more uniform products made for SLS or other polyamide high pressure cast-molding techniques. Nanoparticles having covalently attached chains of polyamide matched to the host polymer will increase hydrogen bonding between the mixed materials increasing mechanical strength and usefulness in rugged applications.

Figure 2:
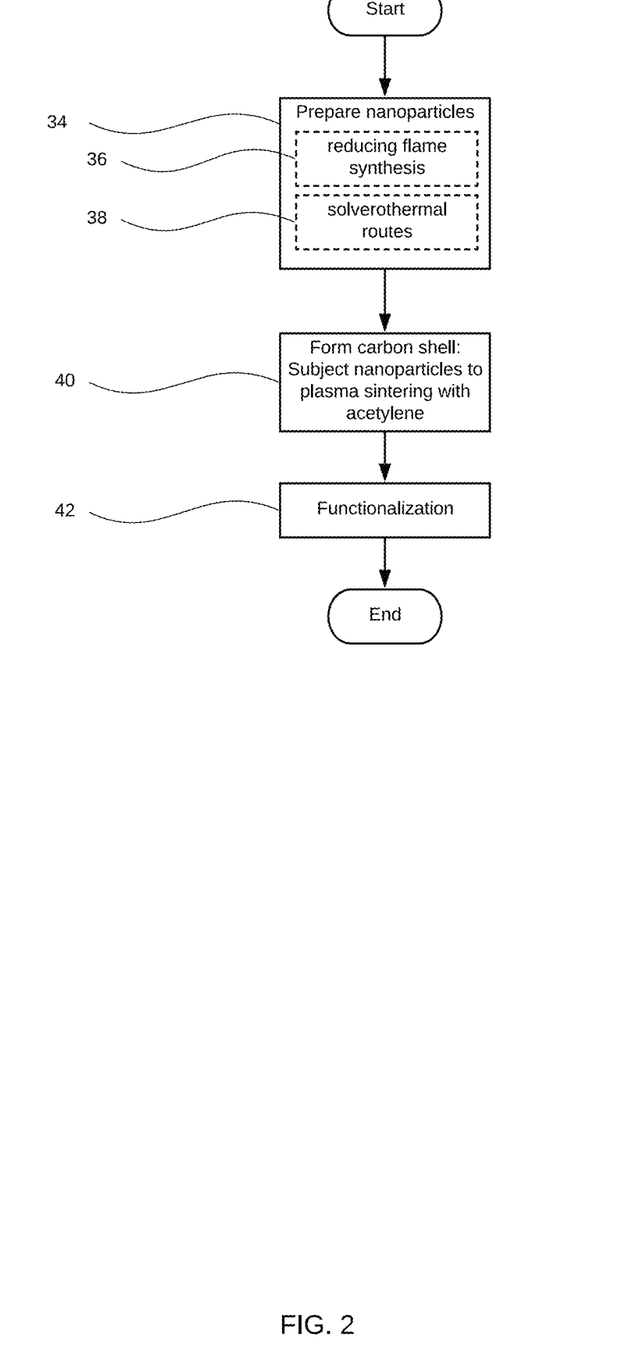
FIG. 2 is a flowchart for a method of preparing functionalized nanoparticles in accordance with the present disclosure.

Referring to FIG. 2. FIG. 2 depicts a flowchart for a method for preparation of nanocrystals and their functionalization. In step 34, nanocrystals may be prepared by reducing flame synthesis 36, a process derived from a nanomaterials-manufacturing method, flame-aerosol synthesis. Nanocrystals in step 34 may also be prepared via solverothermal routes 38. Solverothermal routes 38 may be used to synthesize metal oxides and fluoride nanocrystals as well as quantum dots with any type of functionality. In step 40, a carbon shell is formed around the nanocrystal by reacting the surface of the nanocrystal during plasma sintering with acetylene. In step 42, one way of functionalizing the nanocrystals is via the use of a diazotation reaction is used to functionalize the coated nanocrystal formed in step 40 wherein a halide replacement reaction on a chlorobenzene derivative is used to attach to dangling carbons on the surface of the nanocrystals. Through this diazotation reaction, covalent functionalization of the carbon surface with -chloro, -nitro, and -amine groups may be demonstrated. The -chloro, -nitro, and -amine groups are frequently used linkers presently applied in solid supports. The diazotation reaction is further shown in FIG. 3. However, extending the length of the ligand, for example, in polymerization of the functionalized nanocrystals is further shown in FIG. 4 where a dehydration reaction takes place to lengthen the ligand.

The disclosed ligand functionalization method facilitates closest packing of nanoparticles for producing high loading values in composites that were typically difficult to achieve before without significantly weakening the mechanical and structural properties of the polymer. This is accomplished by synthesizing nanoparticles with covalently tethered polyamide, acrylate, carboxylate, primary amine, or other monomer. This approach enables each particle to act as a multifunctional crosslinking monomer. However, chemical modification of the nanoparticle ligand shell is often deleterious to the desired properties of the core material.

Azide Based Chemistry

One method to produce a variety of options is to first modifying the ligand shell with azide functionality the acrylate monomer can be coupled under benign "click" chemistry conditions (in the presence of oxygen at room temperature in a variety of solvent mixtures).

Cobalt TurboBeads® functionalized with terminal azide ligands are coupled to propargyl acrylate in water at room temperature using a copper bromide catalyst with a molar equivalent of sodium ascorbate to maintain the active oxidation state of the copper. The monomer functionalized nanoparticles are then readily purified by separation using a magnet and resuspension in solvent.

Diazotation Reactions

Figure 3:
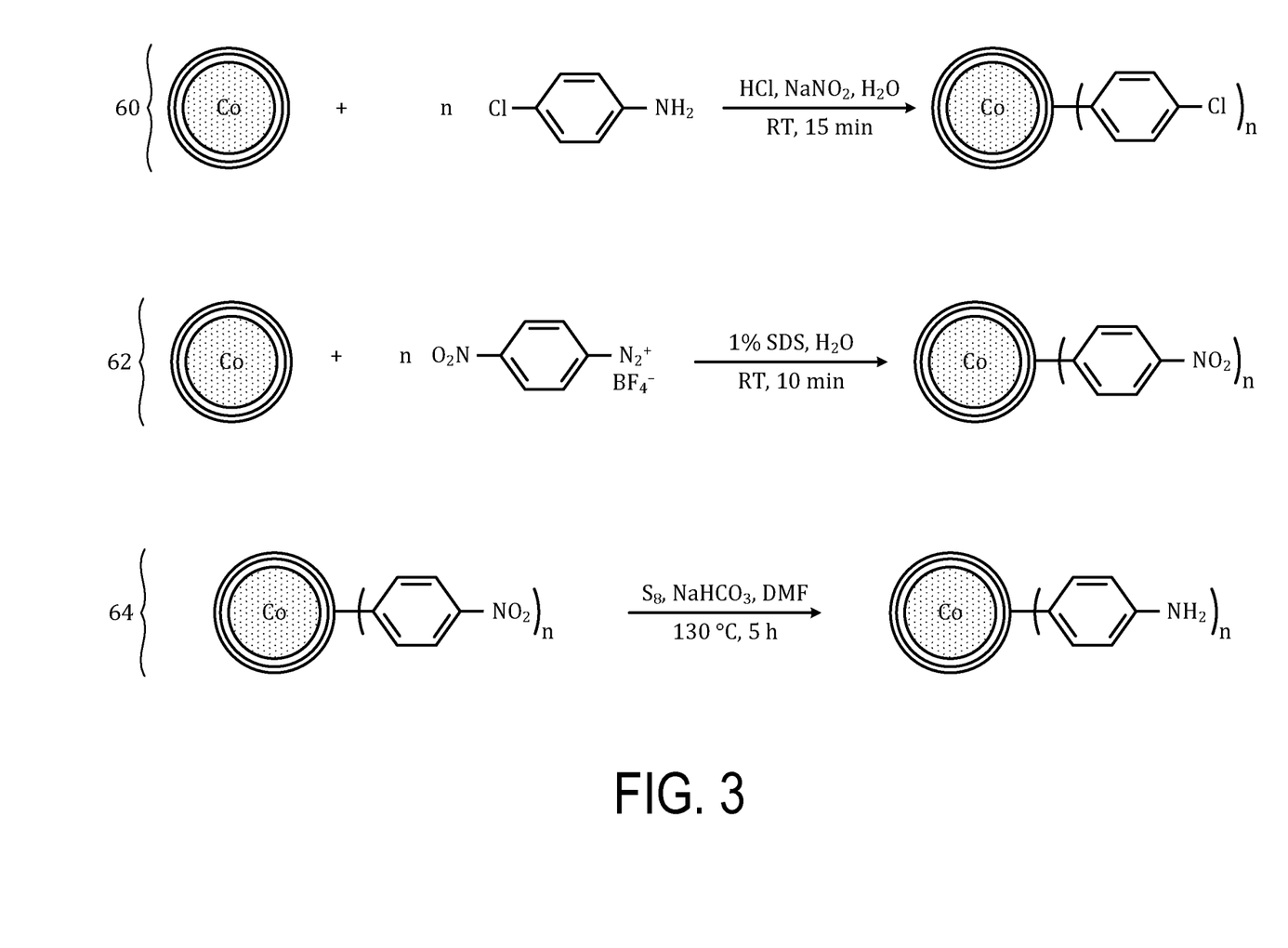
FIG. 3 is a schematic illustrating diazotation reactions.

Referring to FIG. 3, FIG. 3 shows two different diazotation reactions. In 60, chloro groups (—Cl) are introduced to a surface of cobalt nanobeads via reaction with diazonium salt formed in situ from 4-chloroaniline. Under room temperature and in an ultrasound bath, the reaction may be allowed to quickly proceed. Additionally, during this time which the reaction while taking place in an ultrasound bath, evolution of nitrogen gas may be observed. In another example, a sonicating probe may also be used in place of an ultrasound bath. The reaction takes place in presence of hydrochloric acid (HCl), sodium nitrite ($NaNO_2$) and water ($H_2O$). The reaction is allowed to take place for 10 minutes. The product or derivatized material of this reaction may be removed from the reaction mixture with a magnet and washed consecutively with water, hexane, and ethyl acetate and dried in a vacuum. In another example, the product or derivatized material may also be removed using an electromagnet. In 62, a similar reaction to 60 may also take place wherein the product yields a -nitro group (—$NO_2$) instead of a -chloro group (—Cl). In this reaction, 1% of anionic surfactant sodium dodecyl sulfate (SDS) is used in water ($H_2O$). The anionic surfactant may also be referred to as sodium lauryl sulfate (SLS). The reaction is allowed to react for 15 min under room temperature. Solvents in both 60 and 62 may also be removed in a vacuum with or without a heat bath. Without a heat bath, the product may be allowed to dry in a vacuum. In 64, the -nitro group (—$NO_2$) may be converted or reduced to an -amine group (—$NH_2$) via a reaction using octasulfur ($S_8$), sodium bicarbonate ($NaHCO_3$) in dimethylformamide (DMF). The reaction in 64 is allowed to react under 130° C. for 5 hours. The reaction in 64 may also be allowed to react for longer than 5 hours under a lower temperature which may be less than 130° C. The reaction may also be allowed to react for shorter than 5 hours under a higher temperature which may be greater than 130° C.

Lengthening of Functionalized Nanocrystals

Figure 4:
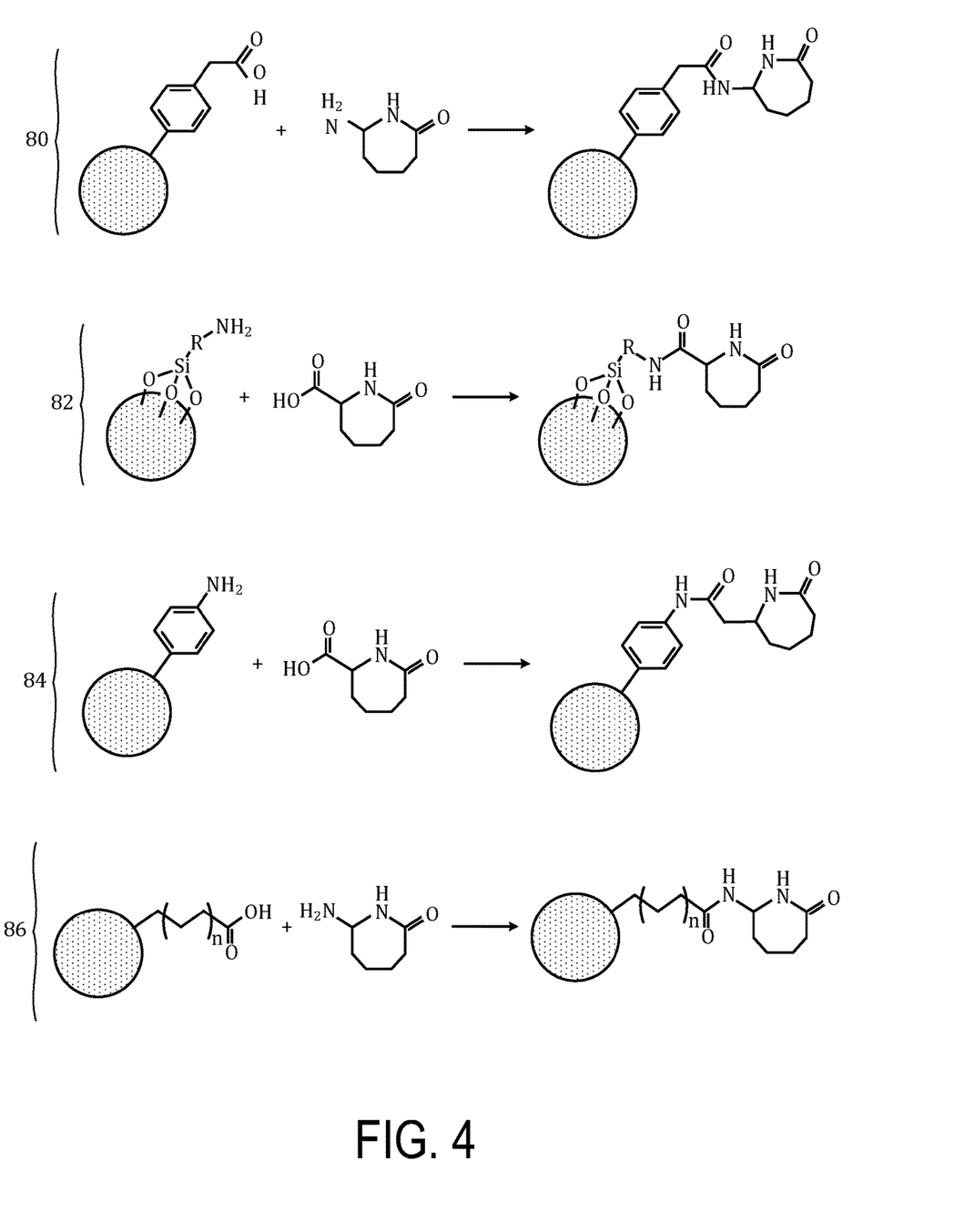
FIG. 4 is a schematic illustrating reactions of a generic functionalized nanocrystal being further lengthened using a aminocaprolactam molecule.

Referring to FIG. 4, FIG. 4 shows reactions of a generic functionalized nanocrystal which may further be lengthened using an aminocaprolactam molecule. To produce selective laser sintering (SLS) quality micron-sized Nylon nanocomposite powders, the nanocrystal surface chemistry must be fine tuned to either melt into an existing Nylon polymer matrix or directly bond to a nylon polymer chain by either beginning the polymerization or terminating it. SLS additive manufacturing (AM) manufacturing requires well-formed polymer beads comprising of a network semicrystal and amorphous network with large molecular weights. Larger molecular weight polymers similar to polyethylene fuse better using SLS because of their optimal surface tension and surface wetting properties. By growing longer chain polyamide from the nanocrystal surface the wettability and SLS properties may be improved.

The reaction at 80 is specifically for the carboxyl functionalized nanocrystal wherein a lactam derivative is covalently attached to the carboxylate group. This dehydration reaction may be reversible and may incorporate different surface anchoring groups. The reaction at 80 shows the basic idea of using a generic nanocrystal with benzoic acid ligand functionalization and an aminocaprolactam molecule. Similarly, the reaction at 86 shows that the functional group extending from the surface of the nanocrystal or quantum dot surface is also a carboxyl group. This group reacts with the amino group (—$NH_2$) resulting in a dehydration reaction as in the reaction at 80. Reactions at 82 and 84 shows an amino group (—$NH_2$) extending from the nanocrystal or QD reacting with the carboxyl group on the caprolactam molecule which, is also a dehydration reaction. The lactam precursor is synthesized using lysine HCl with NaOH in hexanol at 160° C. to form a salt wherein it is converted into final product under a desalination process with NaOH in methanol. Nanoparticles shown in 80, 82, 84, and 86 reactions may be a nanocrystal of quantum dot (QD) selected from a group consisting of metal, metal oxide, fluoride, and chalcogenide. Once a nanocrystal surface is prepared using this method the nanocrystal surface is prepared for fusing and blending into a nylon reaction. The nanocrystals or QDs in reactions in FIG. 4 may be functionalized with a caprolactam, having a 6-membered ring, or a laurel lactam, having a 12-memberd ring. Either one of these closed ring structures open upon polymerization using a ring opening Nylon type reaction. The caprolactam structure may be used to synthesize Nylon 6. Other chain lengths may also be replaced such as laurel lactam, a precursor for Nylon 12.

In one example, functionalizing the surface with (3-glycidoxypropyl) triethoxysilane may target the repeating amide group. This allows for N-Alkylation of an existing polyamide chain, thereby targeting the repeating amide group, creating secondary amide bonds with a silanol functional group anchoring the nanocrystal to the nylon tether. This may be performed before or after blending NCs in polyamide. If performed after the presence of silanol function groups allows for in-situ growth of hydrophobic silica surfaces on the nylon part, which could be produced via casting or by an AM fusing method.

If further improvements to mechanical strength of the AM-produced nanocomposite are required, nylon 12 also offers approach paths. By increasing the degree of hydrogen bonding between the stacked sheets of the polymer solid, mechanical strength may be improved. This improvement may be done by adding co-crystallization polymers to the solid or by incorporating hydrogen-bond-accepting side groups into the nylon backbone.

Synthesis of Polyamide 12 (PA12)

Figure 6A:
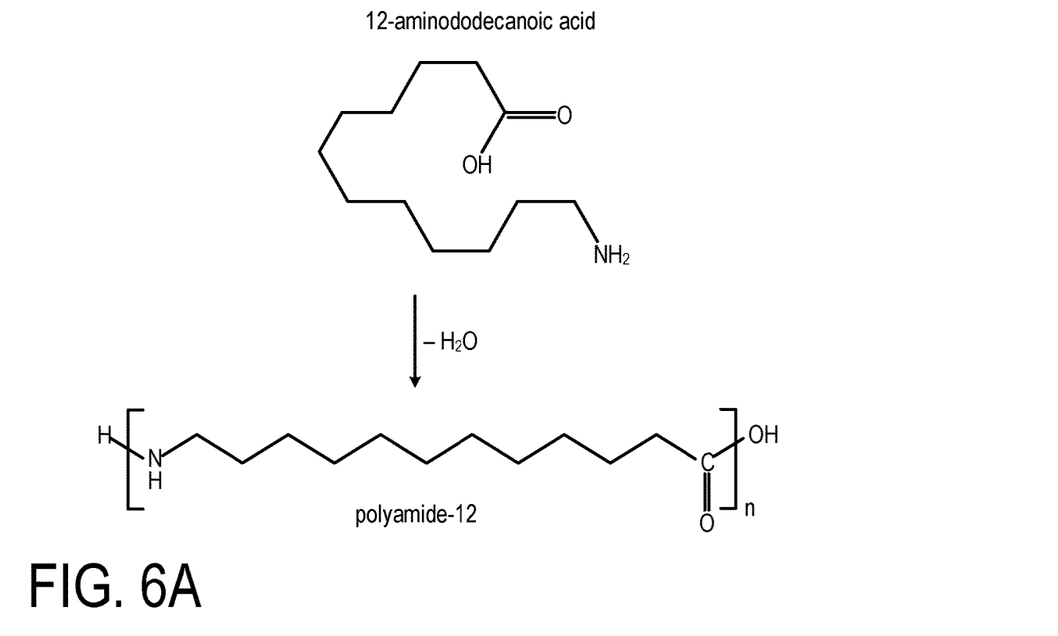
FIGS. 6A and 6B show aspects of example synthetic routes to Nylon 12.
Figure 6B:
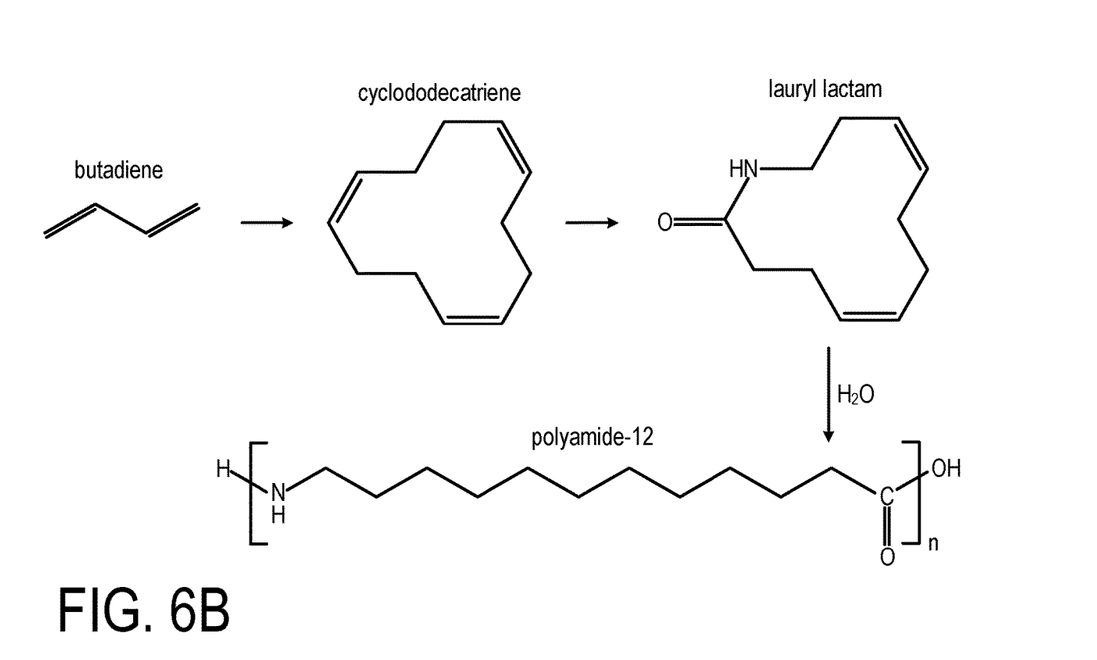

Two routes of synthesis of Nylon 12 or poly amide 12 (PA12) may be used. First, the polymerization of 12-aminododecanoic acid (12-aminolauric acid, m-aminolauric acid) may be used to make PA12, as shown in FIG. 6A. However, due to improved stability, especially at elevated temperatures, ring-opening polymerization (ROP) of dodecane-12-lactam (lauryl lactam), as shown in FIG. 6B, is a preferred method for making selective laser sintering (SLS) powder.

The ROP of lauryl lactam is preferred due to the stability of its product. The degree of polymerization for ROP of laurel lactam is not dependent on the concentration of water and the initiators are less detrimental to polymer stability. Due to Le Chatelier's principle, water may be removed to drive the reaction forward in a condensation polymerization reaction. It is also important to remember that the polymer is a bifunctional terminated molecule with one amine and one carboxylic acid. Therefore, post-polymerization can occur with significant implications. If two end groups on two different polymers chains react and combine, the average molecular weight would double for a two chain system. While this is statistically rare, as ratios of chain ends to non-chain ends are very low. In light of this, molecular weight of the final polymerization may be engineered. Nanocrystals with nylon compatible surface chemistry may be added into a reaction to terminate the polymerization to determine molecular weight. Further, this directly attaches nylon chains of significant length directly onto the surface of nanocrystals to produce more uniform composite blends with better surface wetting properties and increased structural integrity from increased hydrogen bonding.

Preparation of Nylon 12 Composites

Nylon-12 composites (nylon 12+nanoparticle inclusions) may be prepared in two different ways. The first way is to synthesize nylon-12 on its own, without the presence of nanoparticles in solution, then later incorporate magnetic nanoparticles into a re-dissolved nylon solution. The second way is to incorporate nanoparticles in the nylon synthesis solution itself and allow the nylon to form around the PEG-silane functional nanoparticle shell.

Both composite synthesis techniques started from the nylon-12 polymerization reaction. This reaction occurs as a polymerization of laurel lactam in the presence of stabilizers and initiators (stabilizers: monocarboxylic acid and PEG, initiators: N-acetylcaprolactam, NaH) in a solution which is heated for 36 hours at 250° C. under inert atmosphere. During this reaction, the lactam ring opens and water is removed from the reaction vessel yielding nylon-12 with a degree of polymerization and molecular weight that are controlled by the quantity of stabilizer used. Chain length and molecular weight may be engineered using monocarboxylic acids at 0.1 mol %, which terminates polymerization at the chain ends. The result of this reaction was a nylon-12 solid.

The presence of PEG-silane functionalized nanoparticles in the nylon polymerization solution disrupts the polymerization process. Nanoparticles are added into the laurel lactam monomer solution in anhydrous solvents (methanol, 1,4 butanol). After adding the nanoparticles, the reaction was allowed to proceed as described above. However, this resulted in incomplete polymerization and low molecular weight polymer shells around nanoparticles, as indicated by bench top melt tests which showed melting temperatures lower than the expected 180° C.

In another example, first synthesizing nylon-12 polymer on its own, thus insuring the correct molecular weight and chain length. Then, polymer solution may be purified by washing with alcohols and hexanes. Finally, PEG-silane functionalized nanoparticles are dissolved into the purified polymer solution. To produce nanoparticle/nylon-12 composite powder appropriate for SLS, recrystallization of the nylon-12/nanoparticle composite is performed. This is performed by dissolving the purified mixture in methanol and 1,4 butanol and raising the temperature to 140° C. Recrystallization occurs as this solution is cooled at 10° C./hr., allowing the formation of small spherical nylon/nanoparticle composite beads. These composite beads are then collected and formed the AM feedstock.

It is important to note that the flowability and packing efficiency of polymer powders are very important for the SLS process and are determined by factors comprising particle size distribution, moisture content, morphology, surface texture, density, electrostatic charges, and temperature. The four mechanisms that resist particle movement (flow) are: friction, mechanical interlocking, inter-particle forces and liquid bridging. Friction between particles is a material property that is highly dependent on the surface roughness of the particles. If the particles are not spherical and have organic shapes, it is possible for two particles to interlock like two puzzle pieces. Interlocking of particles will resist flow. Inter-particle forces can result in cohesion that could be due to an electrostatic potential. Finally, if there are liquids between the particles, for example water, capillary forces can create a bridge across the interface of two particles resulting in a diminution of independent particle movement.

Loading of Optimized NiZn-Ferrite Nanoparticles into Nylon-12

Figure 5:
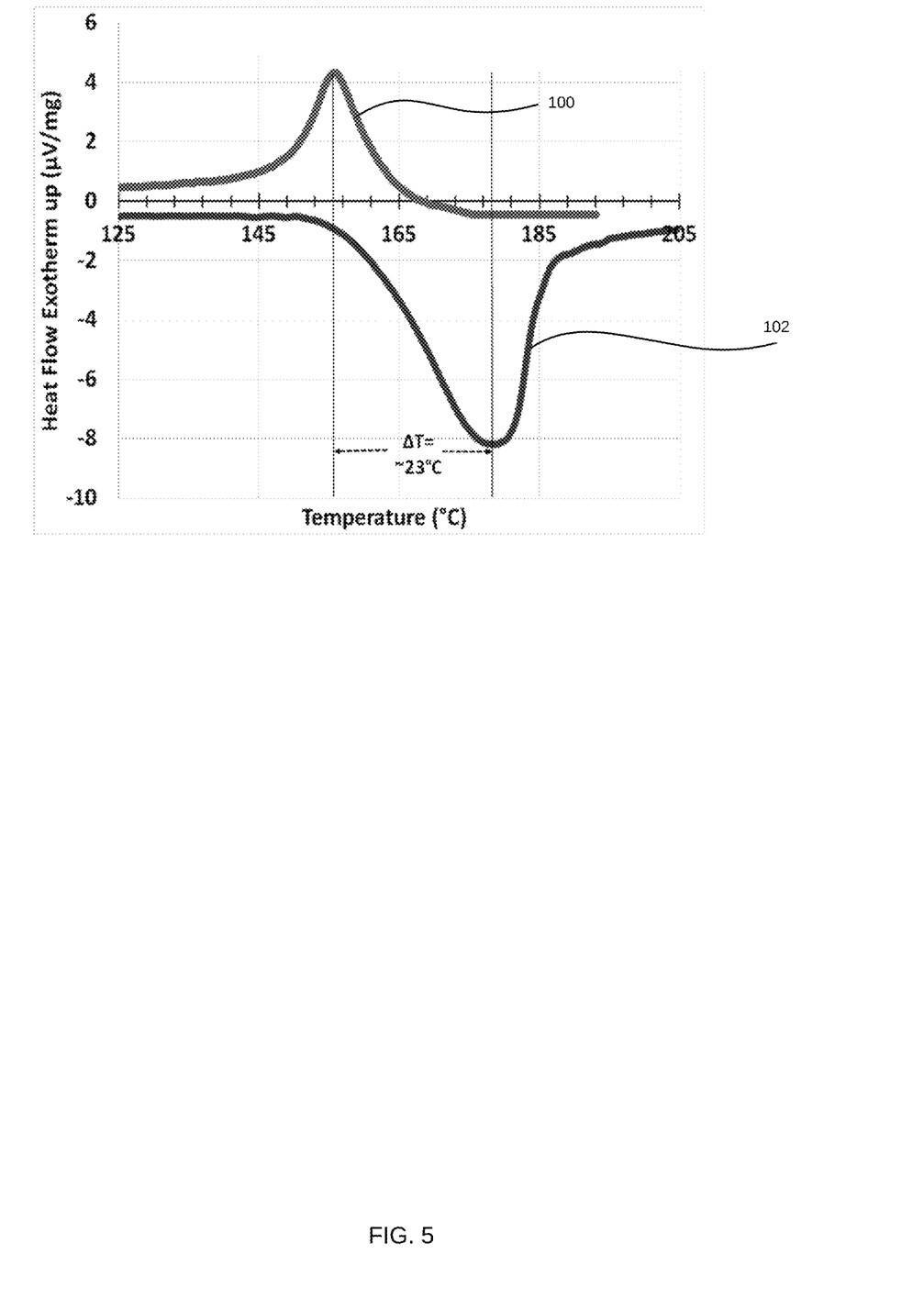
FIG. 5 is a differential scanning calorimetry data graph of nylon 12 synthesized for making ferrite composites using additive manufacturing processes.

Referring to FIG. 5, FIG. 5 shows a Differential Scanning Calorimetry (DSC) data of nylon 12 synthesized for making ferrite composites using Selective Laser Sintering (SLS) and similar additive-manufacturing processes.

To make feedstock for powderbed application, annealed but un-alloyed NiZn-ferrite was introduced into a nylon-12 polymer to create NiZn-ferrite/nylon-12 feedstock. This process involves synthesis of the nylon-12 polymer itself, differential scanning calorimetry (DSC) was performed on as-synthesized nylon-12 to check that melt properties of the nylon-12 phase were consistent with published data on that material and, thus, gain preliminary data on the readiness of the AM feedstock for direct transition to MJF printing. These DSC traces were taken for a single nylon-12 specimen as it was cooled (DSC cooling) 100 and heated (Nylon-12 DSC Heating) 102. A positive peak (i.e., concave down) in DSC indicates a freezing event while a negative (concave up) trace indicates a melting event. From these data, correct melting temperature (179° C.) and crystallization temperature (156° C.) of nylon 12 were confirmed with the expected difference between these two temperatures, $\Delta T=23°$ C. These figures are optimal for SLS-type fusing AM methods.

Nylon for SLS Powderbed

Methods for providing nylons for SLS powderbeds is provided herein. Optimized magneto-dielectric nanocrystals were surface functionalized with primary amines and carboxylic acid groups to polymerize a covalently bonded shell of Nylon from which longer chained Nylon can be grown. This synthesis is performed using compatible solvents to isolate and properly mix each nanocrystal magnetic domain. The outer coating is engineered with Nylon 12 to have properties required for SLS AM.

The magneto-dielectric materials that perform most optimally are ferrites produced from an annealed bulk powder and need to be surface functionalized and wrapped in Nylon. This requires developing organic polymer chemistry that uniformly disperse the nanocrystal while not disrupting the magneto-dielectric properties. Simultaneously maintaining the properties specific to Nylon 12 and producing a powder compatible with SLS.

Of typical Nylons (12, 11, 6, & 6,6), Nylon twelve is the lowest melting temperature (180 C) and lowest recrystallization (130 C) useful for practical purposes. For SLS and similar fusing techniques large M.W. Nylon 12 tends to have optimal surface tension, viscosity, wetting characteristics, and resulting mechanical and electrical properties. Nylon 12 can reproduce molecular weight distributions and melt viscosities under a number of processing conditions.

Nylon 12 mixes the mechanic properties of polyamides (hardness, tensile strength, abrasion resistance with the low water sensitivity, lower glass transition, melting point, and density of long chained hydrocarbons. Therefore Nylon 12 has properties which tend to lie between Nylon 6 and polyethylene. Water transport and low linear swelling properties associated with polyethylene give Nylon 12 dimensional stability with the impact strength and toughness of polyamides under various atmospheric conditions. The crystalline domains are responsible for the strength of the material whereas the amorphous matrix allows the crystalline domains to orient under strain to increase the strength of the material and introduces flexibility to increase the energy to break.

Viscosity and Surface Tension Besides infrared absorption capability a low zero viscosity ($\eta 0$) and a low surfaces tension ($\gamma$) of polymer melt is necessary for successful SLS processing. This is indispensable to generate an adequate coalescence of polymer particles. Especially a low melt viscosity without shear stress is of high importance, as, unlike injection molding, SLS cannot provide an additional compacting during part generation (holding pressure). The required low zero viscosity is also the reason why attempts to process amorphous polymers with SLS usually ends with brittle and instable parts. Due to the fact that viscosity of those polymers above glass transition (Tg) is still very high in general a proper coalescence does not take place usually.

For SLS powders a certain particle size distribution (PSD) is necessary to be processable on SLS equipment. This distribution is favorably between 20 μm and 80 μm for commercial system. The achievable SLS part density is directly linked to powder density in part bed and is thus coupled to the shape of particles and their free flowing behavior. Spherical particles are usually received from co-extrusion processes or spray drying from an emulsion. Potato shaped particles are typical for the today available commercial PA 12 powder confected by precipitation process. Particles obtained from cryogenic milling are inadequate in the majority of cases and fail for SLS processing. Shape and surface of the single particles determine the behavior of the resulting powder to a great extent. In case of SLS powders the particles should be at least as feasible formed spherical. This is in order to induce an almost free flowing behavior and is necessary as SLS powders are distributed on the part bed of an SLS machine by roller or blade systems and will not be compacted additionally. A simple approach to access the flowability of powders is the determination of bulk and tap density. Determination of bulk and tap density gives a good indication on the one hand regarding powder density which is correlated with the final part density and on the other hand regarding the flowability by calculation of the so called Hausner ratio HR [7]. Regarding literature, a HR<1.25 means free flowing powder behaviour and a HR>1.4 means fluidization problems (cohesive properties). HR=$\rho tap/\rho bulk$ ($\rho loose$=bulk density; $\rho tap$=tapped density).

Nylon 12 is traditionally prepared using monomers of the straight chained w-aminododeconoic acid (ADDA) in a condensation polymerization or from a hydrolytic or anionic polymerization reaction using ring chains of laurel lactam. Either monomer is mixed with stabilizer and initiator and heated 200° C. to 300° C. Water is removed from the reaction vessel yielding Nylon 12 with a degree of polymerization and molecular weight (M.W.) controlled by the quantity of stabilizer used. Chain length and M.W. is engineered using mono and di-carboxylic acids at 0.1 mol % terminating polymerization at the ends. In both reactions, especially with anionic polymerization of laurel lactam, the quantity of water greatly influences the resulting product. For this same reason other solvents used to disperse nanocrystals into monomer blends before polymerization must be chosen not to disrupt or influence polymerization.

The solubility of the starting monomers and resulting Nylon 12 polymer differs and is used to identify, isolate, and purify reaction products. Nylon 12 and low molecular weight oligomers are stable or soluble in formic acid, methanol and other ethers. Powders are produced by pulverizing bulk casts in a grinder or by precipitating from solution using an incompatible solvent.

Nylons grown with even-even number of carbon symmetry result in a crystal structure with strong hydrogen bonds between polyamides resulting in a sheet-like structure. Hydrogen bonded sheets stack together in unison produces the α-phase. The unique properties of PA12 are a result of the equally spaced successive amide groups that lead to a high hydrogen bond density in the crystal.

Semicrystalline polyamides can exhibit polymorphism at room temperature taking on both monoclinic and triclinic unit cells resulting from hydrogen bonding chain alignments between sheets and stack of sheets. Heating polyamides to higher temperatures results in a change of the crystalline unit cell related to temperature dependent chain packing. The temperature at which this change occurs is called the Brill temperature ($T_b$). Above $T_b$ the melting behavior is governed by the formation of a psuedohexagonal γ crystal phase. Nylon can be characterized by XRD. A peak at 2θ=6.9° corresponds to the 002 signal from the α crystal phase. The peak at 19 corresponding 100 planes from chain spacing which is fixed by the degree of hydrogen bonding. The peak at 23 is a mixed reflection from the 010/110 planes and corresponds to the intersheet distance. On heating, the interchain 100 (d=0:42 nm) and intersheet 010 (d=0:39 nm) reflections merge to an extent that no further deconvolution is feasible. The merger of the interchain 100 and intersheet 010 reflections. On cooling from a temperature below the melting temperature, the expected contraction in the intersheet distance decreases. The strength of the hydrogen bonding between the interchain amide groups increases due to a decrease in the motion of the methylene units. This causes an increase in the intersheet distance with respect to the original distance.

Characterization of Nylon using FTIR is possible. Bands at 3303, 3215, and 3085 $cm^{-1}$ are associated with NH stretch vibrations, and those at 3215 and 3085 cm−1 are also associated with Amide I and II overtones. The methylene sequences between the NH groups are found to become more disordered than the methylene sequences between the CO groups. the vibrational bands associated to the methylene sequences next to the CO groups are 977 and 1054 cm−1 and the bands associated to the methylene sequences next to the NH groups are 1230 and 1320 cm−1.

Regarding surface finishes, N-Alkylation with (3-glycidoxypropyl)triethoxysilane (GPS) targeting the amide repeat group creates a secondary amide bond with a silanol functional group for growing hydrophobic silica surfaces on Nylon. This process can be modified to produce a number of surface finishes for various applications.

For improved mechanical strength, polyamides with higher degrees of hydrogen bonding can be used. The addition of cocrystallization polymers and hydrogen bond accepting side groups or copolymers can be incorporated into the Nylon backbone to improve material strength. The nitrogen-bonded hydrogens of one nylon chain hydrogen bond very strongly with the carbonyl oxygens of another nylon chain.

From the description of the present invention provided herein one skilled in the art can manufacture the apparatus and practice the methods in accordance with the present disclosure. Those skilled in the art to which the present invention pertains will recognize that while above-described embodiments and method of manufacture are exemplified using particular materials, others may be combined using these embodiments without departing from the spirit and scope of the present invention. Although some of the embodiments explained above have certain symmetry one skilled in the art will recognize that such symmetry is not a requirement. In summary, the present invention is described above in terms of particular embodiments. The invention, however, is not limited to the embodiments described and depicted herein. Rather, the invention is limited only by the claims appended hereto.

We claim:

1. A composite comprising:
    a sintered nanocrystal;
    a carbon shell arranged on the sintered nanocrystal;
    a functional group bound to the carbon shell and configured to further bind a monomer unit of a polymer.

2. The composite of claim 1, wherein the sintered nanocrystal comprises LiF or $NaYF_4$.

3. The composite of claim 1 wherein the functional group is a condensate of a carboxylic acid and an aminocaprolactam.

4. The composite of claim 1 wherein the functional group is a polyamide, polymerized via dehydration.

5. The composite of claim 1 wherein the composite is a polyamide powder suitably spreadable for additive manufacture.

6. The composite of claim 1 wherein the functional group comprises a primary amine or carboxylic acid.

7. The composite of claim 1 wherein the functional group comprises an amide or lactam.

8. The composite of claim 1 wherein the sintered nanocrystal is sintered via plasma sintering with acetylene, and wherein the plasma sintering forms the carbon shell.

9. The composite of claim 1 wherein the carbon shell is modified via a halide-replacement reaction.

10. The composite of claim 9 wherein the halide-replacement reaction comprises reaction between the carbon shell and p-chloroaniline.

11. The composite of claim 9 wherein the halide-replacement reaction comprises reaction between the carbon shell and p-nitrobenzenediazonium tetrafluoroborate.

12. The composite of claim 1 further comprising a solvent, wherein the sintered nanocrystal with the carbon shell and functional group are dispersed in the solvent.

13. The composite of claim 12, wherein the sintered nanocrystal with the carbon shell and functional group dispersed within the solvent is suitably spreadable for additive manufacture.

14. The composite of claim 12, wherein the sintered nanocrystal with the carbon shell and functional group dispersed within the solvent takes a form of a filament suitable for additive manufacture.

15. A composite comprising:
    a sintered nanocrystal;
    a carbon shell arranged on the sintered nanocrystal;
    a functional group bound to the carbon shell and configured to further bind a monomer unit of a polymer; and
    a branched polymer bound to the functional group.

16. The composite of claim 15 wherein the functional group includes a carboxyl group.

17. The composite of claim 15 wherein the functional group includes a benzoic acid derivative.

18. The composite of claim 17 wherein the benzoic acid derivative is an aminocaprolactam condensate.

19. The composite of claim 17 wherein the benzoic acid derivative is a laurellactam condensate.

* * * * *